United States Patent
Berte'

(10) Patent No.: US 6,326,430 B1
(45) Date of Patent: Dec. 4, 2001

(54) THICKENING AGENTS FOR ACIDIC AQUEOUS COMPOSITIONS

(75) Inventor: Ferruccio Berte', Bergamo (IT)

(73) Assignee: 3V SIGMA S.p.A., Milan (IT)

( * ) Notice: Subject to any disclaimer, the term of this patent is extended or adjusted under 35 U.S.C. 154(b) by 0 days.

(21) Appl. No.: 09/492,767

(22) Filed: Jan. 27, 2000

Related U.S. Application Data

(63) Continuation of application No. PCT/EP98/04611, filed on Jul. 22, 1998.

(30) Foreign Application Priority Data

Jul. 30, 1997 (IT) .............................. 97A001824

(51) Int. Cl.$^7$ .................................................. C08K 3/00
(52) U.S. Cl. ............................................................ 524/555
(58) Field of Search ............................................. 524/555

(56) References Cited

U.S. PATENT DOCUMENTS 4,542,175 9/1985 Fink et al. .

FOREIGN PATENT DOCUMENTS 0 395 282 10/1990 (EP) .
2070686 9/1971 (FR) .

*Primary Examiner*—Edward J. Cain
(74) *Attorney, Agent, or Firm*—Birch, Stewart, Kolasch & Birch, LLP

(57) ABSTRACT

A method for thickening an acidic aqueous composition. The method is based upon the addition of a crosslinked cationic homopolymer of a cationic monomer of formula I $$R_1\text{---}CH\!=\!\underset{\underset{R}{|}}{C}\text{---}\underset{\underset{}{\overset{O}{\|}}}{C}\text{---}O\text{---}R_2\text{---}\underset{\underset{R_5}{|}}{\overset{\overset{R_3}{|}}{N^+}}\text{---}R_4 \quad X^-$$

in which: R is hydrogen, $(C_{1-4})$alkyl, or the radical $CH_2COOH$, $R_1$ is hydrogen, methyl, carboxy, or the radical $CH_3\text{---}CH\!=\!CH$, $R_2$ is methylene or a straight or branched $(C_{2-4})$ alkylene moiety, $R_3$, $R_4$, and $R_5$ are independently hydrogen or $(C_{1-4})$ alkyl, and X is chlorine, bromine, iodine, hydrogen sulfate, or methosulfate to the aqueous solution in an amount ranging from about 0.01 to about 5% of the weight of the acidic aqueous composition. The homopolymers are crosslinked with a crosslinking agent containing at least two ethylenically unsaturated moieties present in amounts ranging from not less than 50 to about 600 ppm of the homopolymer total weight.

17 Claims, No Drawings

THICKENING AGENTS FOR ACIDIC AQUEOUS COMPOSITIONS

This application is a continuation of PCT/EP98/04611 filed Jul. 22, 1998.

The present invention relates to the use of specific crosslinked cationic homopolymers as thickening agents for acidic aqueous compositions. Typical acidic aqueous compositions which can be thickened by the crosslinked cationic homopolymers described in the invention are those for domestic use, such as toilet cleaners and laundry softeners.

The first ones comprise, as active ingredients, acids or mixtures of acids such as hydrochloric, phosphoric, maleic, citric, oxalic, malonic, sulfamic acid and analogs, whereas laundry softeners are compositions which comprise cationic surfactants as active ingredients. Examples of these surfactants are long alkyl chain dialkyldimethylammonium salts which are, however, used in limited amounts due to their biodegradability problems. In fact, they have been replaced, partly or completely, by cationic surfactants belonging to the family of the so-called "ester quats" (G. R. Whalley, Happi, February 1995, page 55; I. Shapiro et al., Cosmetics and Toiletries, 109, 77, 1994), which are quaternary ammonium salts, containing at least a group Z—CO—O—, in which Z is a straight or branched ($C_{8-25}$) alkyl, saturated o unsaturated, characterized in that the non-carbonylic oxygen of such group is linked to the quaternary nitrogen through a straight or branched ($C_{1-5}$), preferably ($C_{2-3}$), alkylene chain.

Typical non-limiting examples of "ester quats" are

A) imidazole derivatives of formula

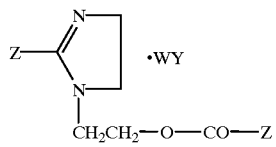

B) di-hydroxypropylammonium esters of formula

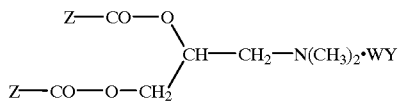

C) amidoaminoesters of formula

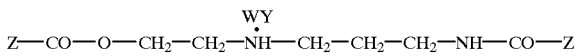

D) esters of formula

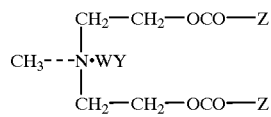

In the above mentioned compounds, W is hydrogen or a suitable group for quaternising the nitrogen atom(s), such as methyl, ethyl, hydroxyethyl and analogs, the groups Z can be the same or different, and Y is essentially a chloride, bromide, iodide, hydrogen sulfate or methosulfate anion.

The acidic aqueous compositions which are referred to in the present invention often contain other auxiliary components, such as perfumes, dyes, optical bleachers and analogs, and are in the form of very fluid aqueous systems, i.e. with viscosity values close to those of water. For this reason, they suffer from problems which make their use awkward, such as the outflow of the liquid from the container in an undesired amount, with the consequent use of excessive amounts of the composition which, as in the case of laundry softeners, can, although temporarily, affect the properties of the fabric, or involve repeated rinses, with a waste of water, time and power. A further problem, mainly connected with marketing reasons, is that compositions with fluidity similar to water lack that "creamy" consistence that better gives the idea of softness.

On the other hand, when very sloped or even vertical ceramic surfaces are to be cleaned, as is the case of tiled walls, wash-basins or water-closets, the fluidity of the composition makes it to quickly flow over said surfaces, thus decreasing the contact times between the active components of the composition and soil, without attaining its homogeneous distribution on them, so that remarkable amounts of the composition itself are necessary to obtain the desired effect.

Conventional thickeners have been used, such as cellulose derivatives, guar gum, xanthane gum, water-soluble anionic polymers either non crosslinked or partially crosslinked, with unsatisfactory results.

It is anyway common practice to thicken aqueous compositions by adding synthetic polymer compounds, whose nature depends on the intended use of the thickened composition, in order to overcome this and other drawbacks. The choice of the suitable thickening agent depends on the type of the composition and on its use. Anionic or cationic polymeric thickeners can be used. Very frequently, they are crosslinked copolymers of acrylamide and other ethylenically unsaturated monomeric units, in which the crosslinking agent is present in amounts which depend on the desired crosslinking degree and, as a consequence, on the intended use of the copolymer (see U.S. Pat. Nos. 3,968,037 and 4,806,345). EP 395 282 suggests the use of crosslinked cationic homopolymers and copolymers to thicken particularly acidic aqueous systems (pH<4), for example solutions for cleaning metals, for removing rust, germicides, detergents for ceramic articles such as those based on citric, phosphoric and hydrochloric acids, in which the crosslinking agent has to be present in very specific amounts (from 5 to no more than 45 ppm—parts per million) of the polymer weight, in that the best performances are reportedly attained only within such range of crosslinking agent. In practice, however, EP 395 282 discloses the use of acrylamide/dimethylaminoethyl methacrylate copolymers quaternised with $CH_3Cl$. Finally, EP 494 554 describes cationic acrylamide/dimethylaminoethyl methacrylate copolymers quaternised with $CH_3Cl$, in which the weight ratio of the two monomers is preferably 80:20, crosslinked with 50 to 100 ppm of bisacrylamidoacetic acid. These crosslinked cationic copolymers are used as thickening agents in laundry softeners for domestic use. However, acrylamide, which is still present in the final products, is known to be a highly toxic compound. Therefore, a thickening agent for acidic aqueous compositions whose preparation does not involve the use of said substance, is highly requested also from the industrial point of view.

As stated above, the present invention relates to the use of specific crosslinked cationic homopolymers as thickening agents for acidic aqueous compositions. More particularly, said crosslinked cationic homopolymers are homopolymers of cationic monomers of formula I

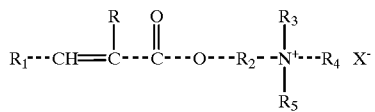

crosslinked with a crosslinking agent present in amounts ranging from not less than 50 to about 600 ppm of the homopolymer total weight.

A further object of the present invention relates to the use of the above mentioned crosslinked cationic homopolymers as thickening agents for acidic aqueous compositions containing an "ester quat" cationic surfactant.

In formula I, R is hydrogen, $(C_{1-4})$-alkyl, or the radical $CH_2COOH$, $R_1$ is hydrogen, methyl, carboxy, or the radical $CH_3$—$CH$=$CH$, $R_2$ is methylene or a straight or branched $(C_{2-4})$ alkylene moiety, $R_3$, $R_4$ and $R_5$ are independently hydrogen or $(C_{1-4})$ alkyl and X is chlorine, bromine, iodine, hydrogen sulfate or methosulfate.

$(C_{1-4})$Alkyl substantially means methyl, ethyl, propyl, isopropyl, n.-butyl, isobutyl, sec.-butyl and tert.-butyl, whereas a straight or branched $(C_{2-4})$ alkylene moiety substantially means ethylene, 1,3-propylene, 1- and 2-methylethylene, 1,4-butylene, isobutylene and analogs.

A preferred group of compounds of formula I are those in which R is hydrogen or methyl, $R_1$ is hydrogen or methyl, $R_2$ is methylene, ethylene or 1,3-propylene, $R_3$, $R_4$ and $R_5$ are independently hydrogen, methyl or ethyl and X is chlorine, bromine, hydrogen sulfate and methosulfate.

A second preferred group of compounds of formula I are those in which R is hydrogen or methyl, $R_1$ is hydrogen, $R_2$ is methylene or ethylene, $R_3$, $R_4$ and $R_5$ are methyl and X is chlorine, hydrogen sulfate and methosulfate.

All the compounds containing at least two ethylenically unsaturated moieties can be used as crosslinking agents. Illustrative examples of said crosslinking agents are divinyl benzene, allyl acrylates and methacrylates, diacrylates and dimethacrylates of glycols and polyglycols, butadiene, 1,7-octadiene, allyl-acrylamides and allyl-methacrylamides, bisacrylamidoacetic acid, N,N'-methylene-bisacrylamide and polyol polyallylethers, such as polyallylsaccharose and pentaerythritol triallylether. Preferred crosslinking agents are allyl-acrylamides and allyl-methacrylamides, bisacrylamidoacetic acid and N,N'-methylene-bisacrylamide. The most preferred crosslinking agent is N,N'-methylene-bisacrylamide.

The crosslinking agents are used in amounts ranging from not less than 50 ppm to about 600 ppm of the homopolymer total weight. Preferably, the crosslinking agent is present in amounts from about 60 to about 250 ppm of the homopolymer total weight. Contrary to what could be expected, it has surprisingly been found that the viscosities of the acidic aqueous compositions remained substantially steady with increasing amounts of crosslinking agent, while the rheology properties of the compositions improved. From the practical point of view, the thus thickened acidic aqueous compositions are easy to handle and to use, they flow out from the container only in the desired amounts and are devoid of substantial stringy consistency. Moreover, the thus thickened acidic aqueous compositions proved to be stable to storage, as substantially neither sedimentation products nor appreciable changes in viscosity are observed, even after long times.

The thickening agents used for the purposes of the present invention are added to acidic aqueous compositions in amounts ranging from about 0.01 to about 5% of the weight of the compositions themselves. Preferably, the amounts used vary from about 0.1 to about 3.5% of the composition weight.

Therefore, a further object of the present invention comprises acidic aqueous compositions thickened with from about 0.01 to about 5% by weight of one or more of the thickening agents described in the present invention and, preferably, with from about 0.1 to about 3.5% of the composition weight.

A further object of the present invention relates to acidic aqueous compositions comprising an "ester quat" cationic surfactant, thickened with from about 0.01 to about 5% by weight of one or more of the thickening agents described in the present invention and, preferably, with from about 0.1 to about 3.5% of the composition weight.

The crosslinked cationic homopolymers used as thickening agents for acidic aqueous compositions, according to what described in the present invention, are products partly known in literature, including the patent one (see, for instance, U.S. Pat. No. 4,172,066). Nevertheless, crosslinked cationic homopolymers of monomeric units of formula I in which the crosslinking agent is N,N'-methylene-bisacrylamide, present in amounts ranging from not less than 50 to about 600 ppm of the homopolymer total weight, preferably from about 60 to about 250 ppm, have never expressly been described. Therefore, a further object of the present invention relates to the above mentioned crosslinked cationic homopolymers.

The crosslinked cationic homopolymers used as thickening agents for acidic aqueous compositions, according to what described in the present invention, can be prepared according to the conventional polymerization techniques. Reverse emulsion polymerization is preferred in which, for example, an aqueous solution of the selected monomer and of the crosslinking agent is emulsified in a phase consisting of one or more water-immiscible organic liquids. The water-immiscible organic liquids are, generally, oily liquids, such as straight or branched $(C_{5-20})$ saturated hydrocarbons, vaseline oil, aromatic hydrocarbons such as benzene, toluene and xylenes, halo solvents, or mixtures thereof. The oily phase can contain an emulsifying system, typically one having an HLB (Hydrophilic-Lipophilic Balance) ranging from about 2 to about 7, comprising, for example, sorbitan esters, glycerol esters and analogs or mixtures thereof, to promote the dispersion of the aqueous phase which, in addition to the monomer of formula I and the crosslinking agent in the selected amounts, also contains one of the polymerization initiators commonly used in the art, such as the product marketed as WAKO® V 50. The polymerization is carried out at temperatures ranging from about room temperature to about 100° C., and is completed in substantially quantitative yields in a time which can range from about 1 to about 12 hours. The desired crosslinked cationic homopolymer can be recovered in the solid form, if desired, by distillation of the reaction mixture under vacuum. Said solid form is then ground and sieved to obtain a powder which is easily dispersible in the acidic aqueous composition. Alternatively, a homogeneous dispersion of the polymer in the oily phase, both in the hydrated and in the anhydrous forms, can be obtained by azeotropical distillation of water. In this case, it is preferable to add, at the end of the process, a given amount of a phase inversion surfactant with HLB ranging from about 8 to about 16, such as ethoxylated lauryl alcohol with ethoxylation degree from 4 to 12, which does not affect the stability of the emulsion but quickens the dispersion of the emulsion when added to the acidic aqueous compositions.

This oily homogeneous dispersion can be added as it is to the acidic aqueous composition. For the purposes of the present invention, the use of the crosslinked cationic homopolymers in the form of solid dispersible powders is preferred.

The preparation of the thickened acidic aqueous composition is also carried out conventionally, adding the fluid composition with the given amount of crosslinked cationic homopolymer, or with a mixture of said homopolymers, either as dispersible solid powders or in the form of oily homogeneous dispersions, so as to obtain a composition having the desired viscosity and rheology.

The following examples further illustrate the invention.

Preparation of crosslinked cationic homopolymers as powders

A solution A is prepared, consisting of 438.0 g of a 75% solution of dimethylaminoethyl methacrylate quaternised with $CH_3Cl$ in demineralized water, x grams of a 1% solution of N,N'-methylene-bisacrylamide (the values of x will be reported in table 1 below) in demineralized water, (20-x) grams of demineralized water, 0.1 g of DISSOL-VINE® D-40 and 1.5 g of 10% WAKO® V-50 in demineralized water. Solution B is then prepared, consisting of 150 g of n-decane and 15 g of SPAN® 80.

Solution A is emulsified in solution B. The resulting emulsion is poured into a polymerization reactor and, after removing oxygen by nitrogen bubbling, the polymerization is carried on at 60° C. for 6 hours. Upon distillation under vacuum at temperatures comprised between 20 and 120° C., a solid is recovered, which is ground and sieved (hole diameter: 1–2 mm), to obtain an easy-to-use powder which is easily dispersible in an aqueous medium.

Table 1 reports the amounts x of 1% solution of N,N'-methylene-bisacrylamide in demineralized water and its respective amounts expressed in ppm. The table also reports the viscosities of two commercially available laundry softeners [LENOR®, PROCTER & GAMBLE Italia S.p.A. (comp. A) and COCCOLINO®, UNILEVER Italia S.p.A. (comp. B), both comprising "ester quat" cationic surfactants] thickened with 0.3% by weight of the crosslinked cationic homopolymers with the given amounts of N,N'-methylene-bisacrylamide (NN-MBA), prepared as described above. Viscosities were measured with a Brookfield RVT viscosimetre (T. 20° C., 20 rpm, spindler 5) after the compositions reached their equilibrium, and are expressed in cps (centipoises).

TABLE 1

| Ex. | x (g) | NN-MBA (ppm) | Viscosity (comp. A) (cps) | Viscosity (comp. B) (cps) |
| --- | --- | --- | --- | --- |
| 1 | 2 | 60 | 1000 | 1500 |
| 2 | 2.3 | 70 | 1200 | 1500 |
| 3 | 3 | 90 | 1000 | 1500 |
| 4 | 4 | 120 | 1000 | 1400 |

The thickened compositions did not substantially show stringy character. Viscosity and rheology remained unchanged up to 5 weeks. Analogous results were obtained thickening 5% aqueous solutions of "ester quat" cationic surfactants.

Table 2 reports the viscosity of a commercially available strongly acidic detergent composition for removing lime scales from ceramic surfaces (VIAKAL®, PROCTER & GAMBLE Italia S.p.A.), thickened with 2.5% by weight of the cationic homopolymers crosslinked with the given amounts of N,N'-methylene-bisacrylamide (NN-MBA), prepared as described above. The meaning of x is the same as that in table 1. The viscosities were measured and expressed as indicated above.

TABLE 2

| Ex. | x (g) | NN-MBA (ppm) | Viscosity (cps) |
| --- | --- | --- | --- |
| 5 | 2 | 60 | 2500 |
| 6 | 2.3 | 70 | 3000 |
| 7 | 3 | 90 | 1800 |

The thickened compositions did not substantially show stringy character. Viscosity and rheology remained unchanged for up to 5 weeks.

Preparation of crosslinked cationic homopolymers as emulsions

A solution A is prepared, consisting of 438.0 g of a 75% solution of dimethylaminoethyl methacrylate quaternised with $CH_3Cl$ in demineralized water, x grams of a 1% solution of N,N'-methylene-bisacrylamide (the values of x will be reported in table 3 below) in demineralized water, (20-x) grams of demineralized water, 0.1 g of DISSOL-VINE® D-40 and 1.5 g of 10% WAKO® V-50 in demineralized water. A solution B is then prepared, consisting of 250.0 g of vaseline oil, 75.0 g of n-decane and 15.0 g of SPAN® 80. Solution A is emulsified in solution B. The resulting emulsion is poured into a polymerization reactor and, after removing oxygen by nitrogen bubbling, the polymerization is carried on at 60° C. for 6 hours. First, water is distilled off azeotropically between 90 and 110° C., then n-decane is also distilled. The mixture is cooled at room temperature, and subsequently added with 20.0 g of ethoxylated lauryl alcohol with ethoxylation degree 7, thus obtaining a homogeneous, stable dispersion of the crosslinked cationic homopolymer in vaseline oil, having a dull white appearance and a viscosity of 1800 cps (centipoises), measured with a Brookfield RVT viscosimetre, spindler 3, at 20° C. and 20 rpm. The resulting product is used directly to thicken a laundry softener composition.

Table 3 reports the amounts x of 1% solution of N,N'-methylene-bisacrylamide in demineralized water and the respective amounts of NN-MBA expressed in ppm. The table also reports the viscosity of a commercially available laundry softener (COCCOLINO®, UNILEVER Italia S.p.A. thickened with 0.5% by weight. of the homogeneous dispersion in vaseline oil prepared as described above. Said amount corresponds to about 0.25% of crosslinked cationic homopolymer with the givens amounts of N,N'-methylene-bisacrylamide (NN-MBA). Viscosities were measured as described above.

TABLE 3

| Ex. | x (g) | NN-MBA (ppm) | Viscosity (cps) |
| --- | --- | --- | --- |
| 8 | 2.3 | 60 | 1800 |
| 9 | 3 | 90 | 2000 |
| 10 | 6 | 180 | 1900 |

The thickened compositions did not substantially show stringy character. Viscosity and rheology remained unchanged up to 5 weeks.

What is claimed is:

1. A method for thickening an acidic aqueous composition which comprises adding thereto, in an amount ranging from about 0.01 to about 5% of the weight of said acidic aqueous composition, a crosslinked cationic homopolymer of a cationic monomer of formula I

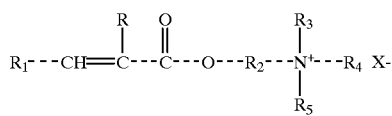

in which: R is hydrogen, $(C_{1-4})$alkyl, or the radical $CH_2COOH$, $R_1$ is hydrogen, methyl, carboxy or the radical $CH_3$—$CH$=$CH$, $R_2$ is methylene or a straight or branched $(C_{2-4})$ alkylene moiety, $R_3$, $R_4$ and $R_5$ are independently hydrogen or $(C_{1-4})$ alkyl and X is chlorine, bromine, iodine, hydrogen sulfate or methosulfate, wherein said homopolymers are crosslinked with a crosslinking agent containing at least two ethylenically unsaturated moieties present in amounts ranging from not less than 50 to about 600 ppm of the homopolymer total weight.

2. The method for thickening an acidic aqueous composition as claimed in claim 1, in which R is hydrogen or methyl, $R_1$ is hydrogen or methyl, $R_2$ is methylene, ethylene or 1,3-propylene, $R_3$, $R_4$ and $R_5$ are independently hydrogen, methyl or ethyl and X is chlorine, bromine, hydrogen sulfate and methosulfate.

3. The method for thickening an acidic aqueous composition as claimed in claim 1, in which R is hydrogen or methyl, $R_1$ is hydrogen, $R_2$ is methylene or ethylene, $R_3$, $R_4$ and $R_5$ are methyl and X is chlorine, hydrogen sulfate and methosulfate.

4. The method for thickening an acidic aqueous composition as claimed in claim 1, in which the crosslinking agent is selected from allyl-acrylamides, allyl-methacrylamides, bisacrylamidoacetic acid and N,N'-methylene-bisacrylamide.

5. The method for thickening an acidic aqueous composition as claimed in claim 1, in which the crosslinking agent N,N'-methylene-bisacrylamide.

6. The method for thickening an acidic aqueous composition as claimed in claim 1, in which the crosslinking agent is present in amounts ranging from about 60 to about 250 ppm of the homopolymer total weight.

7. The method for thickening an acidic aqueous composition as claimed in claim 1 in the form of solid dispersible powders.

8. The method for thickening an acidic aqueous composition as claimed in claim 1 as thickening agents for acidic aqueous compositions, comprising a cationic surfactant selected from quaternary ammonium salts, containing at least a group Z—CO—O—, in which Z is a straight or branched $(C_{8-25})$ alkyl, saturated o unsaturated, characterized in that the non-carbonylic oxygen of such group is linked to the quaternary nitrogen through a straight or branched $(C_{1-5})$ alkylene chain.

9. An acidic aqueous composition thickened with a crosslinked cationic homopolymer in accordance with the method of claim 1.

10. The acidic aqueous composition as claimed in claim 9, in which the crosslinked cationic homopolymer used as thickening agent is present in amounts ranging from about 0.1 to about 3.5% of the composition weight.

11. The acidic aqueous composition as claimed in claim 9, comprising a cationic surfactant selected from quaternary ammonium salts, containing at least a group Z—CO—O—, in which Z is a straight or branched $(C_{8-25})$ alkyl, saturated o unsaturated, characterized in that the non-carbonylic oxygen of such group is linked to the quaternary nitrogen through a straight or branched $(C_{1-5})$ alkylene chain.

12. A crosslinked cationic homopolymer of a cationic monomer of formula I

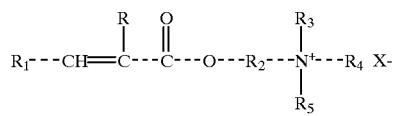

in which R is hydrogen, $(C_{1-4})$-alkyl, or the radical $CH_2COOH$, $R_1$ is hydrogen, methyl, carboxy or the radical $CH_3$—$CH$=$CH$, $R_2$ is methylene or a straight or branched $(C_{2-4})$ alkylene moiety, $R_3$, $R_4$ and $R_5$ are independently hydrogen or $(C_{1-4})$ alkyl and X is chlorine, bromine, iodine, hydrogen sulfate or methosulfate, wherein said homopolymers are crosslinked with a crosslinking agent containing at least two ethylenically unsaturated moieties present in amounts ranging from not less than 50 to about 600 ppm of the homopolymer total weight.

13. The crosslinked cationic homopolymer as claimed in claim 12 in which R is hydrogen or methyl, $R_1$ is hydrogen or methyl, $R_2$ is methylene, ethylene or 1,3-propylene, $R_3$, $R_4$ and $R_5$ are independently hydrogen, methyl or ethyl and X is chlorine, bromine, hydrogen sulfate and methosulfate.

14. The crosslinked cationic homopolymer as claimed in claim 12 in which R is hydrogen or methyl, $R_1$ is hydrogen, $R_2$ is methylene or ethylene, $R_3$, $R_4$ and $R_5$ are methyl and X is chlorine, hydrogen sulfate and methosulfate.

15. The crosslinked cationic homopolymer as claimed in claim 12, in which the crosslinking agent is selected from allyl-acrylamides, allyl-methacrylamides, bisacrylamidoacetic acid and N,N'-methylene-bisacrylamide.

16. The crosslinked cationic homopolymer as claimed in claim 12, in which the crosslinking agent N,N'-methylene-bisacrylamide.

17. The crosslinked cationic homopolymer as claimed in claim 12 characterized in that the crosslinking agent is present in amounts ranging from about 60 to about 250 ppm of the homopolymer total weight.

* * * * *